(12) United States Patent
Masoud et al.

(10) Patent No.: US 9,851,438 B2
(45) Date of Patent: Dec. 26, 2017

(54) METHOD AND SYSTEM TO IDENTIFY AND ESTIMATE RELAXATION FREQUENCIES FOR GROUND PENETRATING RADARS

(71) Applicant: King Fahd University of Petroleum and Minerals, Dhahran (SA)

(72) Inventors: Ahmad A. Masoud, Dhahran (SA); Ali A Al-Shaikhi, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 574 days.

(21) Appl. No.: 14/522,171

(22) Filed: Oct. 23, 2014

(65) Prior Publication Data

US 2016/0116580 A1 Apr. 28, 2016

(51) Int. Cl.
*G01S 13/88* (2006.01)

(52) U.S. Cl.
CPC .................. *G01S 13/885* (2013.01)

(58) Field of Classification Search
CPC .... G01S 13/885; G01S 13/0209; G01S 13/88; G01S 7/28; G01V 3/12; G01V 3/17; H01Q 21/08; H01Q 3/24; H01Q 3/2682
See application file for complete search history.

(56) References Cited

U.S. PATENT DOCUMENTS

| | | | |
|---|---|---|---|
| 4,686,532 A | | 8/1987 | McAulay |
| 5,384,715 A | * | 1/1995 | Lytton ............... G01V 3/12 324/334 |
| 2003/0090406 A1 | | 5/2003 | Longstaff et al. |
| 2010/0277358 A1 | | 11/2010 | Duvoisin, III et al. |
| 2014/0019050 A1 | * | 1/2014 | Lambot ............... G01V 3/38 702/7 |
| 2014/0022106 A1 | | 1/2014 | Duvoisin et al. |

OTHER PUBLICATIONS

Mu-Hsin Wei, "Estimation of the discrete spectrum of relaxations for electromagnetic induction responses" May 2011, https://smartech.gatech.edu/bitstream/handle/1853/39534/wei_mu_h_201105_mast.pdf.

* cited by examiner

*Primary Examiner* — Clayton E LaBalle
*Assistant Examiner* — Ruifeng Pu
(74) *Attorney, Agent, or Firm* — Oblon, McClelland, Maier & Neustadt, L.L.P.

(57) ABSTRACT

A system and associated methodology identifies and estimates relaxation frequencies, which are used by a Ground Penetrating Radar (GPR). These estimated relaxation frequencies are used to characterize and interpret a reflected GPR signal from a ground. The system also identifies the number of relaxation frequencies and estimates their magnitudes and values. The system also exhibits high resistance to noise.

19 Claims, 13 Drawing Sheets

METHOD AND SYSTEM TO IDENTIFY AND ESTIMATE RELAXATION FREQUENCIES FOR GROUND PENETRATING RADARS

TECHNICAL FIELD

The present disclosure relates to methods and systems for ground penetrating radars.

BACKGROUND

Ground penetrating radars (GPRs) operate by radiating a spectrum-rich, impulse-like signal into a ground that is to be explored, where a radiated signal travels through earth's sub-layers. Objects encountered by the radiated signal absorb energy. The absorbed electromagnetic energy resonates within the objects. Resonant energy that is trapped inside the objects quickly dissipates, since part of it is re-radiated to above the ground. A resonant frequency of an object is based on its size and the electrical properties of both the object and surrounding material. These resonant frequencies are responsible for creating what is known as relaxation frequencies in the frequency spectrum of a reflected signal. Determining the number of relaxation frequencies strengths and values, permits the characterizing of the object. Thus, GPR is employed routinely to obtain an image of subsurface structures and objects. GPR has been applied to groundwater and oil-reservoir exploration. Accordingly, what is needed, as recognized by the present inventor, is a method and a system capable of estimating the relaxation frequency for ground penetrating radars.

The foregoing "background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention. The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY

A method for identifying and estimating relaxation frequencies from a reflected signal of a ground penetrating radar (GPR) signal is disclosed. The method uses processing circuitry configured to obtain an estimate of the number of the relaxation frequencies, to compute a complex spectrum based on the reflected signal, to compute an expanded vector based on the complex spectrum, to assume values and magnitudes of the relaxation frequencies, to compute a hypothesis expanded spectrum based on the values and the magnitudes of the relaxation frequencies, and to update the values and the magnitudes using a recursive structure until stopping criteria is met.

A system for identifying and estimating relaxation frequencies from a reflected signal of a ground penetrating radar (GPR) signal is also disclosed. The system uses processing circuitry configured to obtain an estimate of the number of the relaxation frequencies, to compute a complex spectrum based on the reflected signal, to compute an expanded vector based on the complex spectrum, to assume values and magnitudes for the relaxation frequencies, to compute a hypothesis expanded spectrum based on the magnitudes and the values of the relaxation frequencies, and to update the magnitudes and the values using a recursive structure until stopping criteria is met.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
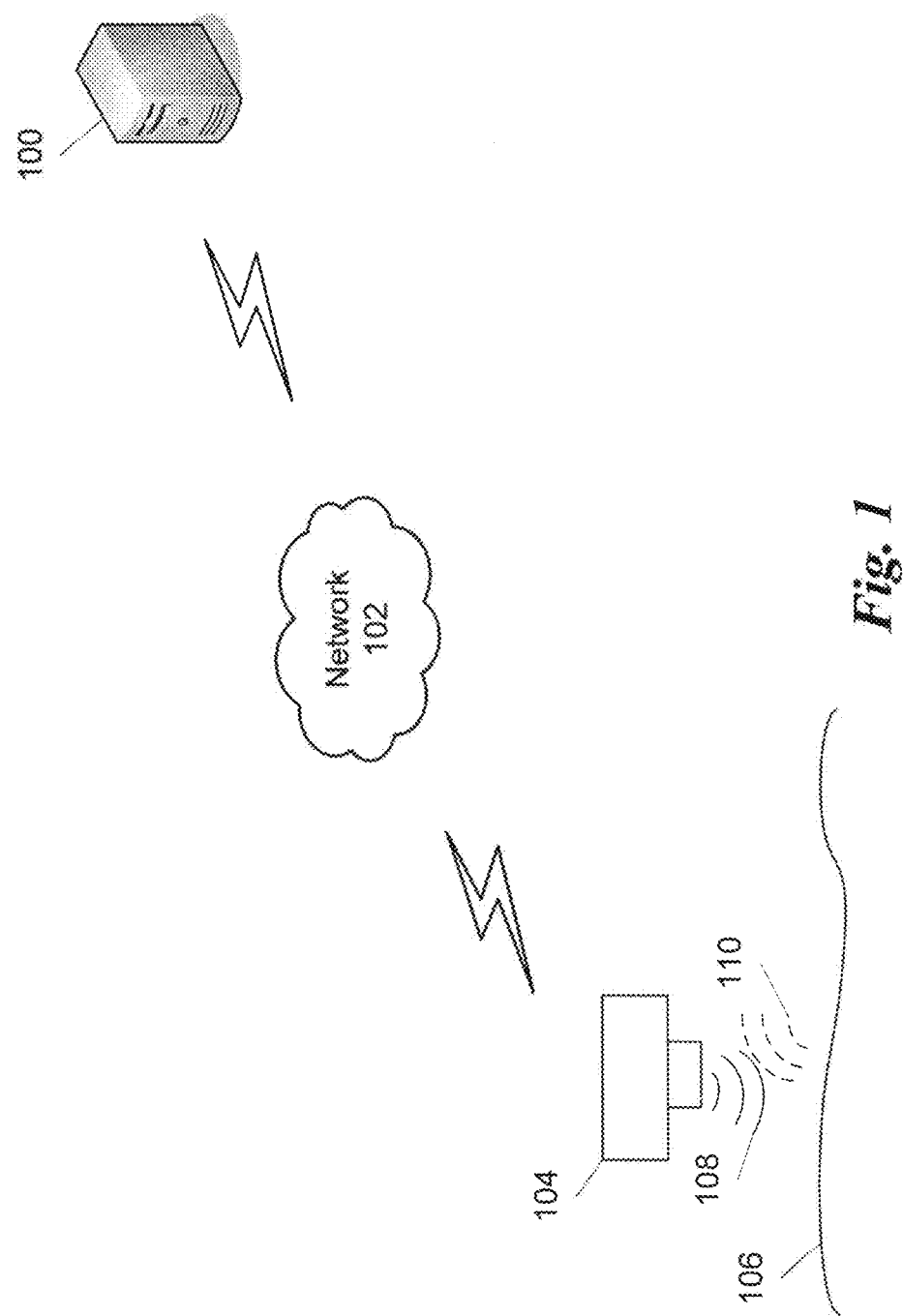
FIG. 1 is an exemplary schematic of a system for estimating relaxation frequencies for ground penetrating radars according to one example.

Referring now to the drawings, wherein like reference numerals designate identical or corresponding parts throughout several views, the following description relates to a system and associated methodology for identifying and estimating relaxation frequencies from a reflected ground penetrating radar (GPR) signal.

GPR may be used as a non-destructive imaging method. GPR may be used for measuring depths of subsurface geological structures such as sand dunes, geological layers or water table depths. Data obtained from the GPR may be used by oil exploration industry, mining industry, geotechnical investigations and groundwater exploration. The GPR may use high frequency pulsed electromagnetic waves to acquire subsurface information. Energy is propagated downward into the ground. The reflected GPR signal is recorded. The reflected GPR signal depends on the subsurface geological structures.

Specially, as shown in the drawings and the related discussion, the system and the associated methodology determine the relaxation frequencies, values, and magnitudes.

FIG. 1 is an exemplary schematic of a system for identifying and estimating the relaxation frequencies from the reflected GPR signal. FIG. 1 shows a GPR device 104 positioned above ground 106. The GPR device 104 may be moved along the ground 106. The GPR device 104 may be any device capable of transmitting an electromagnetic signal 108 and detecting a reflected signal as would be understood by one of ordinary skill in the art. In selected embodiments, the GPR device 104 may transmit measurements via a network 102 to a server 100. The server 100 then may perform calculation to identify and estimate the relaxation frequencies. The network 102 is any network that allows the server 100 and the GPR device 104 to communicate information with each other such as, wide area network, local area network or the internet. In selected embodiments, the GPR device 104 may be equipped with a WiFi device or a Bluetooth device. In selected embodiments, the GPR device may include radar electronics, antennas, a data digitizer, a computer, a display module, and other components as known to those of skill in the art. In one embodiment, the GPR device 104 method of operation may be that disclosed in U.S. Pat. No. 7,167,124 B2 entitled "DATA ACQUISITION FOR A GROUND PENETRATING RADAR SYSTEM", the entire disclosure of which is incorporated herein by reference. In other embodiments, the calculation may be performed in the GPR device.

The GPR device may use multi frequencies. In one embodiment, the GPR device 104 uses electromagnetic radiation in the radiowave band (HF/VHF/UHF frequencies) of the radio spectrum, and receives the reflected GPR signal from subsurface structures. The frequencies may be chosen according to the GPR application. The reflected GPR signal 110 depends on changes in the structure's physical properties. The GPR method can be used in different applications in a variety of media including rock, soil, ice, fresh water, pavements, and buildings. The GPR method may detect objects and changes in materials, such as surface voids, cavities, and utilities.

GPR measurements are received by the server 100. The reflected GPR signal 110 may be denoted as h(t). The complex frequency spectrum of the reflected GPR signal 110 may be denoted as H(ω). Then, the spectrum evaluated at different frequencies ($\omega_i$, i=1, ..., N) may be expressed by the following equation:

$$\begin{bmatrix} H(\omega_1) \\ H(\omega_2) \\ \vdots \\ H(\omega_N) \end{bmatrix} = \begin{bmatrix} 1 & \frac{1}{1+j\omega_1/\zeta_1} & \frac{1}{1+j\omega_1/\zeta_2} & \cdots & \frac{1}{1+j\omega_1/\zeta_K} \\ 1 & \frac{1}{1+j\omega_2/\zeta_1} & \frac{1}{1+j\omega_2/\zeta_2} & \cdots & \frac{1}{1+j\omega_2/\zeta_K} \\ \vdots & \vdots & \vdots & \ddots & \vdots \\ 1 & \frac{1}{1+j\omega_N/\zeta_1} & \frac{1}{1+j\omega_N/\zeta_2} & \cdots & \frac{1}{1+j\omega_N/\zeta_k} \end{bmatrix} \begin{bmatrix} c_0 \\ c_1 \\ c_2 \\ \vdots \\ c_K \end{bmatrix} \quad (1)$$

where $\zeta_i$ (i=1, ..., K) is the i'th relaxation frequency, $c_i$ is its magnitude and K is the number of those frequencies which may be considered as the order of the true spectrum. All these quantities are unknowns that need to be determined from the samples of H(ω).

Figure 2:
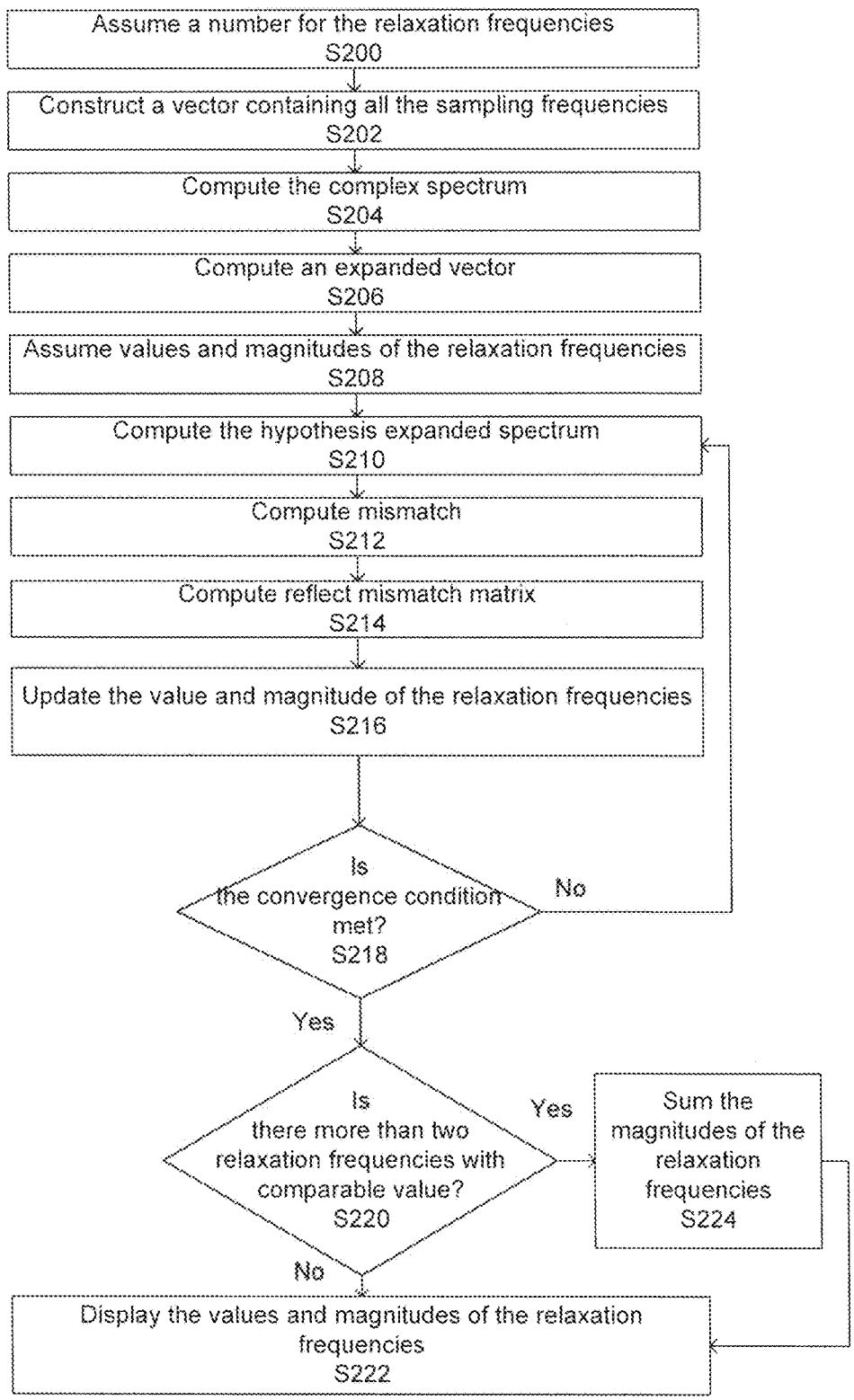
FIG. 2 is an exemplary flow chart illustrating a method to estimate the relaxation frequencies according to one example.

FIG. 2 is a flowchart for estimating the relaxation frequencies according to one example. At step S200, a number of relaxation frequencies is assumed. In selected embodiments, the user may input the number using a user interface. The user may use prior knowledge of the system to choose the number of relaxation frequencies estimated higher than the actual number. In other embodiments, the server 100 may automatically assume the number of relaxation frequencies based on past data stored in the memory. For example, the processing circuitry may analyze the past data to determine the highest number of relaxation frequencies that occurred during a predetermined period and then choose this number as the estimate of the number of relaxation frequencies. At step S202, a vector is constructed containing sampling frequencies at which the spectrum of the reflected GPR signal 110 is sampled. The sampling frequencies at which the spectrum of the reflected GPR signal is sampled may be predetermined frequencies stored in the memory of the server 100. In other embodiments, the user may choose the sampling frequencies from the predetermined frequencies using the user interface. At step S204, the complex spectrum of the reflected GPR signal may be computed by the processing circuitry. At S206, the server 100 using the processing circuitry may compute an expanded vector. The expanded vector is computed by finding real and imaginary parts of the complex spectrum. At step S208, the user may input an assumed set of relaxation frequencies values and a corresponding set of magnitudes. The user may use an interface to input the assumed set of relaxation frequencies values and the corresponding set of magnitudes. In other embodiments, the server may automatically choose the assumed set of relaxation frequencies and the corresponding set of magnitudes based on the past data stored in the memory. At step S210, a hypothesis expanded spectrum is computed. At step S212, a measured mismatch is calculated based on at least the hypothesis expanded spectrum and the expanded vector. At step S214, a reflect mismatch matrix is computed based on the relaxation frequencies values and magnitudes and on the sampling frequencies. At step S216, the server may check if stopping criteria is met. In selected embodiments, the stopping criteria may be a convergence condition but those of skill in the art will recognize that other stopping criteria can be chosen. In response to determining that the convergence condition is met, the server at step S218, checks the value of the relaxation frequencies to determine if two or more have comparable values. If the predetermined convergence condition is not met, the process goes to step S220. In selected embodiments, the server may determine if two or more relaxation frequencies have comparable values by calculating a percentage. The percentage may be calculated based on the difference between the values of the relaxation frequencies. The percentage is then compared to a predetermined percentage. If the percentage is smaller than the predetermined percentage then the values of the relaxation frequencies are considered comparable and the step goes to S224. The predetermined percentage may be stored in the memory of the server 100. The predetermined percentage may be dependent on the noise level in the system.

In selected embodiments, the convergence condition may include calculating a first set of values based on the relaxation frequencies estimates values obtained at step S216 and last relaxation frequencies values stored in the memory. The convergence condition may further include calculating a second set of values based on the magnitudes of the relaxation frequencies calculated at step S216 and the previous magnitude stored in the memory. At step S220, the values and magnitudes of the relaxation frequencies are updated using a discrete recursive estimation structure. In selected embodiments, the discrete recursive estimation structure may use the principle of pseudo force reflection in the feedback. At step S224, the magnitudes of all the relaxation frequencies having comparable values are summed. In response to determining that two or more of the relaxation frequencies do not comparable values, the process goes to step S222. At S222, the server 100 may display the relaxation frequencies values and magnitudes.

In selected embodiments, the vector constructed at step S202 can be written as $\Omega = [\omega_1\ \omega_2\ \ldots\ \omega_N]^T$, then the complex spectrum may be computed at step S204 by applying the following equation:

$$H(\Omega) = \begin{bmatrix} H(\omega_1) \\ \vdots \\ H(\omega_N) \end{bmatrix} \quad (2)$$

The expanded vector that have the real and imaginary parts of $H(\Omega)$ explicitly stated may be written using the following equation:

$$He(\Omega) = \begin{bmatrix} \operatorname{Re}(H(\omega_1)) \\ \vdots \\ \operatorname{Re}(H(\omega_N)) \\ \operatorname{Im}(H(\omega_1)) \\ \vdots \\ \operatorname{Im}(H(\omega_N)) \end{bmatrix} \quad (3)$$

The assumed set of relaxation frequencies ($\Psi_n$) and the corresponding set of magnitudes ($C_n$) can be written as wherein an index n represents the n'$^{th}$ instant at which the assumption is made:

$$\Psi^n = \begin{bmatrix} \zeta_1^n \\ \vdots \\ \zeta_L^n \end{bmatrix}, \quad (4)$$

$$C^n = \begin{bmatrix} c_1^n \\ \vdots \\ c_L^n \end{bmatrix}$$

In selected embodiments, the hypothesis expanded spectrum vector (calculated at S210) may be calculated by applying the following equation:

$$Ha(n, \Omega, \Psi^n, C^n) = \begin{bmatrix} \sum_{i=0}^{L} c_i^n \cdot \frac{\zeta_i^n}{(\zeta_i^n)^2 + (\omega_1)^2} \\ \vdots \\ \sum_{i=0}^{L} c_i^n \cdot \frac{\zeta_i^n}{(\zeta_i^n)^2 + (\omega_N)^2} \\ \sum_{i=1}^{L} -c_i^n \cdot \frac{\omega_1 \cdot \zeta_i^n}{(\zeta_i^n)^2 + (\omega_1)^2} \\ \vdots \\ \sum_{i=1}^{L} -c_i^n \cdot \frac{\omega_N \cdot \zeta_i^n}{(\zeta_i^n)^2 + (\omega_N)^2} \end{bmatrix} \quad (5)$$

In selected embodiments, the measured mismatch may be calculated using the following equation:

$$F(n, \Omega, \Psi^n, C^n) = K \cdot \begin{bmatrix} \left[\operatorname{Re}\left(H(\omega_1) - \sum_{i=0}^{L} c_i^n \cdot \frac{\zeta_i^n}{(\zeta_i^n)^2 + (\omega_1)^2}\right)\right]^\alpha \\ \vdots \\ \left[\operatorname{Re}\left(H(\omega_N) - \sum_{i=0}^{L} c_i^n \cdot \frac{\zeta_i^n}{(\zeta_i^n)^2 + (\omega_N)^2}\right)\right]^\alpha \\ \left[\operatorname{Im}\left(H(\omega_1) - \sum_{i=1}^{L} c_i^n \cdot \frac{\zeta_i^n}{(\zeta_i^n)^2 + (\omega_1)^2}\right)\right]^\alpha \\ \vdots \\ \left[\operatorname{Im}\left(H(\omega_N) - \sum_{i=1}^{L} c_i^n \cdot \frac{\zeta_i^n}{(\zeta_i^n)^2 + (\omega_n)^2}\right)\right]^\alpha \end{bmatrix} \quad (6)$$

where $K$ and $\alpha$ are positive constants that may be predetermined and stored in the memory of the server 100. The reflect mismatch matrix may be calculated using the following equation:

$$T(n, \Omega, \Psi^n, C^n) = \begin{bmatrix} 1 & \cdots & 1 & 0 & \cdots & 0 \\ \frac{(\zeta_1^n)^2}{(\zeta_1^n)^2 + (\omega_1)^2} & \cdots & \frac{(\zeta_1^n)^2}{(\zeta_1^n)^2 + (\omega_N)^2} & \frac{-\zeta_1^n \cdot \omega_1}{(\zeta_1^n)^2 + (\omega_1)^2} & \cdots & \frac{-\zeta_1^n \cdot \omega_N}{(\zeta_1^n)^2 + (\omega_N)^2} \\ \vdots & \ddots & \vdots & \vdots & \ddots & \vdots \\ \frac{(\zeta_L^n)^2}{(\zeta_L^n)^2 + (\omega_1)^2} & \cdots & \frac{(\zeta_L^n)^2}{(\zeta_L^n)^2 + (\omega_N)^2} & \frac{-\zeta_L^n \cdot \omega_1}{(\zeta_L^n)^2 + (\omega_1)^2} & \cdots & \frac{-\zeta_L^n \cdot \omega_N}{(\zeta_L^n)^2 + (\omega_N)^2} \\ 2 \cdot c_1 \cdot \frac{\zeta_1^n \cdot \omega_1^2}{[(\zeta_1^n)^2 + (\omega_1)^2]^2} & \cdots & 2 \cdot c_1 \cdot \frac{\zeta_1^n \cdot \omega_N^2}{[(\zeta_1^n)^2 + (\omega_N)^2]^2} & c_1 \cdot \omega_1 \cdot \frac{(\zeta_1^n)^2 - \omega_1^2}{[(\zeta_1^n)^2 + (\omega_1)^2]^2} & \cdots & c_1 \cdot \omega_N \cdot \frac{(\zeta_1^n)^2 - \omega_N^2}{[(\zeta_1^n)^2 + (\omega_N)^2]^2} \\ \vdots & \ddots & \vdots & \vdots & \ddots & \vdots \\ 2 \cdot c_L \cdot \frac{\zeta_L^n \cdot \omega_1^2}{[(\zeta_L^n)^2 + (\omega_1)^2]^2} & \cdots & 2 \cdot c_L \cdot \frac{\zeta_1^n \cdot \omega_N^2}{[(\zeta_1^n)^2 + (\omega_N)^2]^2} & c_L \cdot \omega_1 \cdot \frac{(\zeta_L^n)^2 - \omega_1^2}{[(\zeta_L^n)^2 + (\omega_1)^2]^2} & \cdots & c_L \cdot \omega_N \cdot \frac{(\zeta_L^n)^2 - \omega_N^2}{[(\zeta_L^n)^2 + (\omega_N)^2]^2} \end{bmatrix} \quad (7)$$

In selected embodiments, step S216 may use the principle of pseudo force reflection in the feedback. The estimation discrete recursive structure may include applying the following equation:

$$\begin{bmatrix} C^{n+1} \\ \Psi^{n+1} \end{bmatrix} = \begin{bmatrix} C^n \\ \Psi^n \end{bmatrix} + T(n, \Omega, \Psi^n, C^n) F(n, \Omega, \Psi^n, C^n) n = 1, 2, \ldots \quad (8)$$

In selected embodiments the convergence condition may be $$|\zeta_i^n - \zeta_i^{n-1}| < \epsilon_1, \quad |C_i^n - C_i^{n-1}| < \epsilon_2 \quad (9)$$

wherein $\epsilon_1$ and $\epsilon_2$ are predetermined values stored in the memory. In selected embodiments, $\epsilon_1$ and $\epsilon_2$ are set depending on the application of the system.

Figure 3:
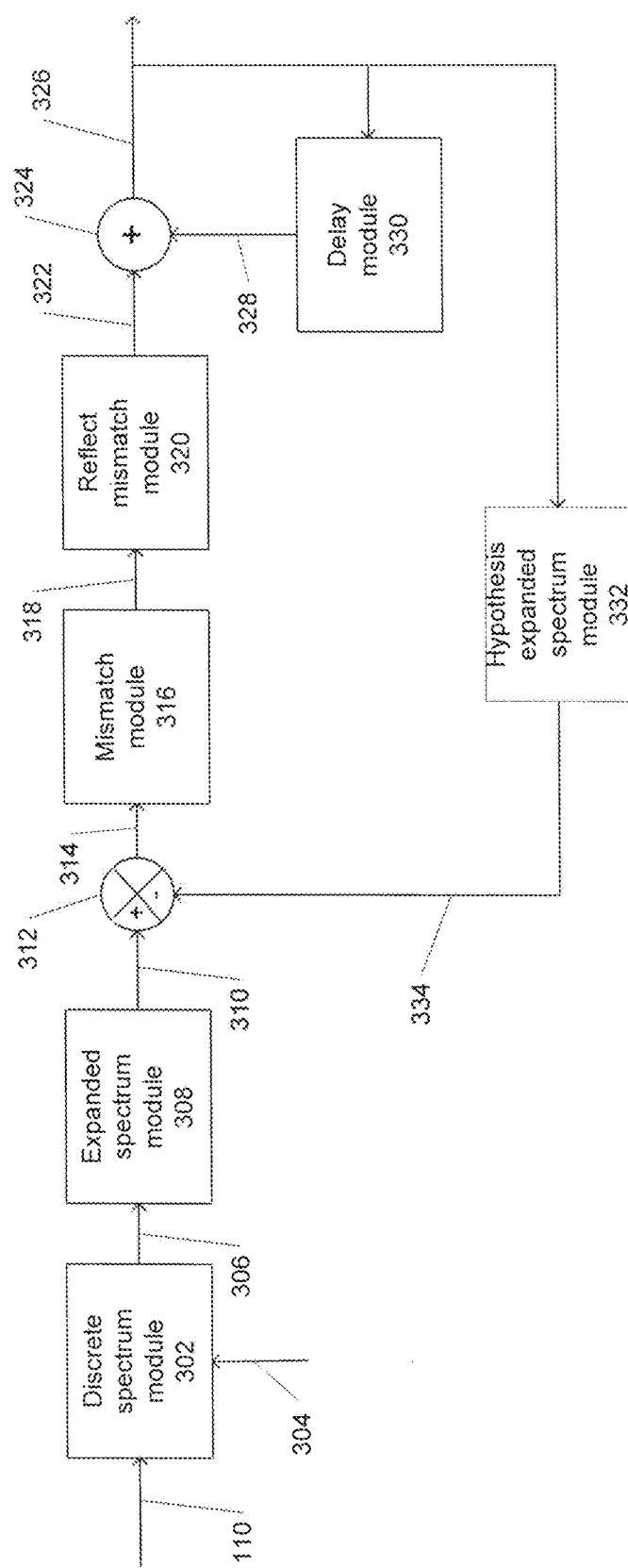
FIG. 3 is an exemplary block diagram illustrating the method to estimate the relaxation frequencies to according to one example.

FIG. 3 is an exemplary block diagram illustrating modules to implement the method to identify and estimate the relaxation frequencies according to one example. A discrete spectrum module 302 generates the complex spectrum 306 and receive the reflected GPR signal 110 and the sampling frequencies 304. Each of the modules described herein may be implemented in circuitry that is programmable (e.g. microprocessor-based circuits) or dedicated circuits such as application specific integrated circuits (ASICS). The complex spectrum 306 is then converted into an expanded spectrum 310 in an expanded spectrum module 308. A mixer 312 mixes the expanded spectrum 310 and the hypothesis expanded spectrum 334 to obtain a mismatch spectrum 314. A mismatch module 316 takes the mismatch spectrum 314 to produce the measured mismatch spectrum 318. The mismatch module 316 may produce the measured mismatch spectrum 318 by multiplying the mismatch spectrum 314 by a constant stored in the memory. A reflect mismatch module 320 find a reflect mismatch spectrum and multiplied it by the measured mismatch spectrum 318. A mixer 324 takes the output from the reflect mismatch module 320 and a delayed spectrum 328 to generate the relaxation frequency estimate 326. The delay module 330 generates the delayed spectrum 328. The hypothesis expanded spectrum module 332 generates the expanded hypothesis spectrum 334 and receive the relaxation frequency estimates 326.

To illustrate the capabilities of the estimation system, exemplary results are presented. A synthetic signal of fully known relaxation frequencies is used in the tests to provide the base truth signal against which the estimates are compared.

In one example, the spectrum of the base truth reflected signal is assumed to contain three relaxation frequencies. Table 1 shows the value and magnitudes for the three relaxation frequencies. In one example, the sampling frequencies at which the complex spectrum is evaluated are: 30, 40, 50, 60, 70, 80, 90, 100, 200, 300, 500, 600, 700, 800, 900, 1000 and 2000. In a first example, five relaxation frequencies are assumed by the user at step S200

TABLE 1

Base-truth relaxation frequencies

| | $\zeta n$ | | | |
|---|---|---|---|---|
| | 0 | 10 | 50 | 900 |
| Cn | ½ | 1 | 1 | 3 |

Table 2 shows the values and magnitude of the relaxation frequencies assumed by the user at step S208.

TABLE 2

Initial guess of the relaxation frequencies

| | $\zeta n$ | | | | | |
|---|---|---|---|---|---|---|
| | 0 | 50.1 | 90.5 | 120 | 200 | 300 |
| Cn | 0.7 | 3.8 | 4.2 | 2.8 | 3 | 5 |

Table 3 shows the final relaxation frequencies and the magnitude after convergence is achieved at step S216. At step S218, the server 100 determines that three of the relaxation frequencies are equals. Table 3 shows three relaxation frequencies having a value of 8.7 with a magnitude of 0.293. At step S224, the magnitudes are added to obtain 0.879, which is very close to the truth value 1 shown in Table 1. The final relaxation frequencies values and magnitudes are very close to the base truth reflected signal shown in Table 1.

TABLE 3

The final estimates of the relaxation frequencies and their magnitudes

| | $\zeta n$ | | | | | |
|---|---|---|---|---|---|---|
| | 0 | 8.7 | 8.7 | 8.7 | 45.7 | 890 |
| Cn | 0.494 | .293 | .293 | .293 | 1.121 | 2.995 |

Figure 4:
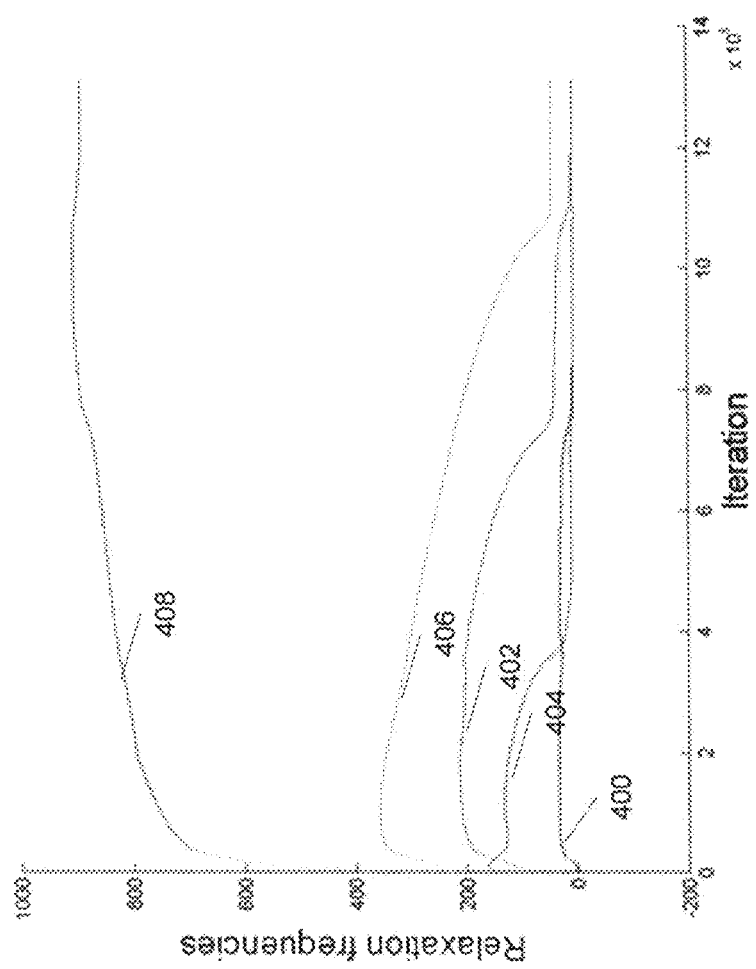
FIG. 4 shows evolution curves of the relaxation frequencies estimates according to one example.

FIG. 4 is a graph that shows the evolution of the relaxation frequencies with the number of iterations. The trace 400, 402, 404, 406 and 408 shows the relaxation frequencies values versus the iterations number. The magnitude of the zero relaxation frequency converged close to the value and magnitude of the base truth one shown in Table 1.

In a second example, the number of relaxation frequencies assumed at step S200 is three. Table 4 shows the initial guess made by the user at step S208. Table 5 shows the final estimates obtained from the server 100 at step S216.

TABLE 4

Initial guess

| | $\zeta n$ | | | |
|---|---|---|---|---|
| | 0 | 50.1 | 90.5 | 120 |
| Cn | 0.7 | 3.8 | 4.2 | 2.8 |

TABLE 5

| Final estimates | | | | |
|---|---|---|---|---|
| | $\zeta_n$ | | | |
| | 0 | 12.1 | 45.6 | 890 |
| Cn | 0.521 | .79 | 1.09 | 3.03 |

Figure 5:
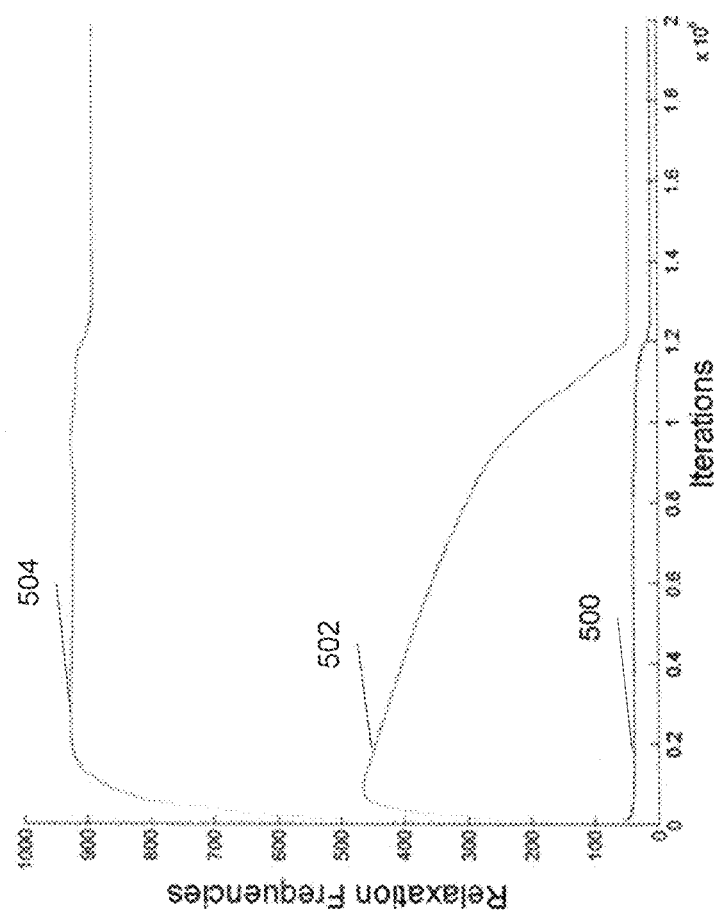
FIG. 5 shows evolution curves of the relaxation frequencies estimates according to one example.

FIG. 5 is a graph that shows the traces of the convergence. The traces 500, 502, 504 show the relaxation frequencies values versus the iteration numbers.

In selected embodiments, noise from different sources may affect the measurements. The effect of noise on the estimation structure is examined. In one example, the complex spectrum is sampled at 50 points that are uniformly distributed in the interval $[2\pi, 600\pi]$. Seven relaxation frequencies are assumed by the user at step S200.

Table 6 shows the initial guess made at step S208 made by the user. The noise level is varied and the values of the estimates is recorded for different signal to noise ratios (SNR).

In one example, the SNR is equal to 100 dB. Table 7 shows four frequencies having the same value 11.4855. Thus, at step S224, the server sums the magnitudes to obtain 0.8876. Further, Table 7 shows two relaxation frequencies having comparable values 53.6164 and 44.744. The magnitudes are summed 1.0031 very close to the base truth value 1 shown in Table 1.

TABLE 6

| Initial guess | | | | | | | | |
|---|---|---|---|---|---|---|---|---|
| | $\zeta_n$ | | | | | | | |
| | 0 | 30 | 40 | 200 | 300 | 500 | 700 | 800 |
| Cn | 0.7 | 3.8 | 4.2 | 2.8 | 3 | 5 | 4 | 4 |

TABLE 7

| Final estimates, SNR = 100 dB | | | | | | | | |
|---|---|---|---|---|---|---|---|---|
| | $\xi_n$ | | | | | | | |
| | 0 | 11.4855 | 11.4855 | 11.4855 | 53.6164 | 11.4855 | 44.744 | 899.987 |
| Cn | 0.5027 | 0.2219 | 0.2219 | 0.2219 | 0.5612 | 0.2219 | 0.4419 | 3.0024 |

Figure 6:
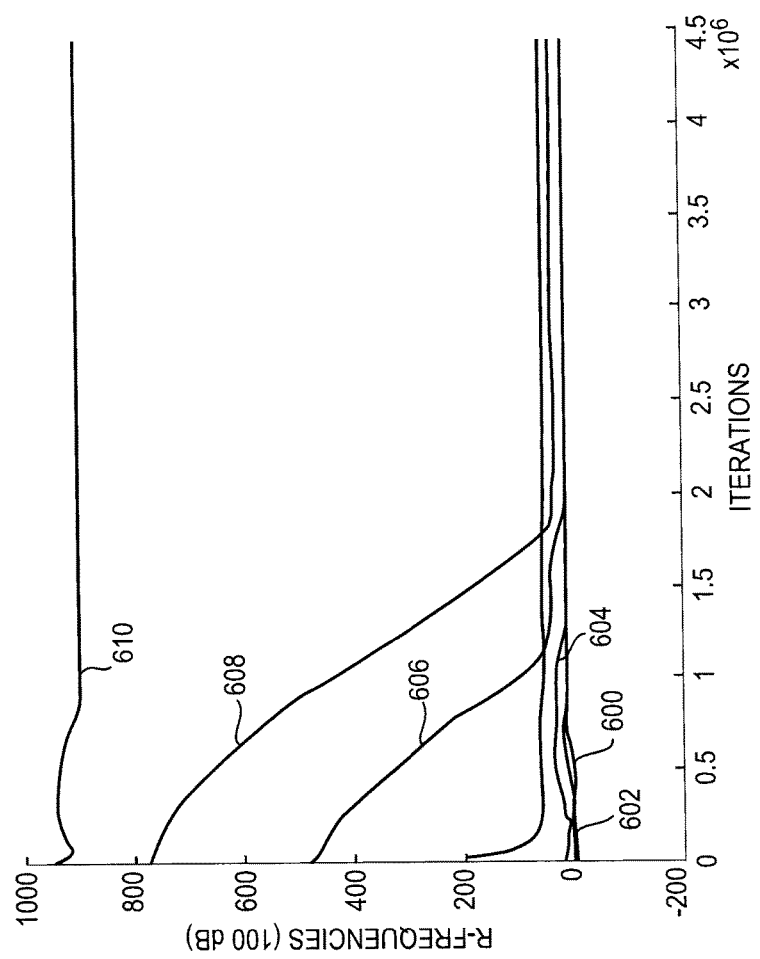
FIG. 6 shows evolution curves of the relaxation frequencies estimates according to one example.

FIG. 6 is a graph that shows the evolution of the relaxation frequencies with the number of iterations. The traces 600, 602, 604, 606, 608, and 610 show the relaxation frequencies values versus the iteration numbers.

Figure 7:
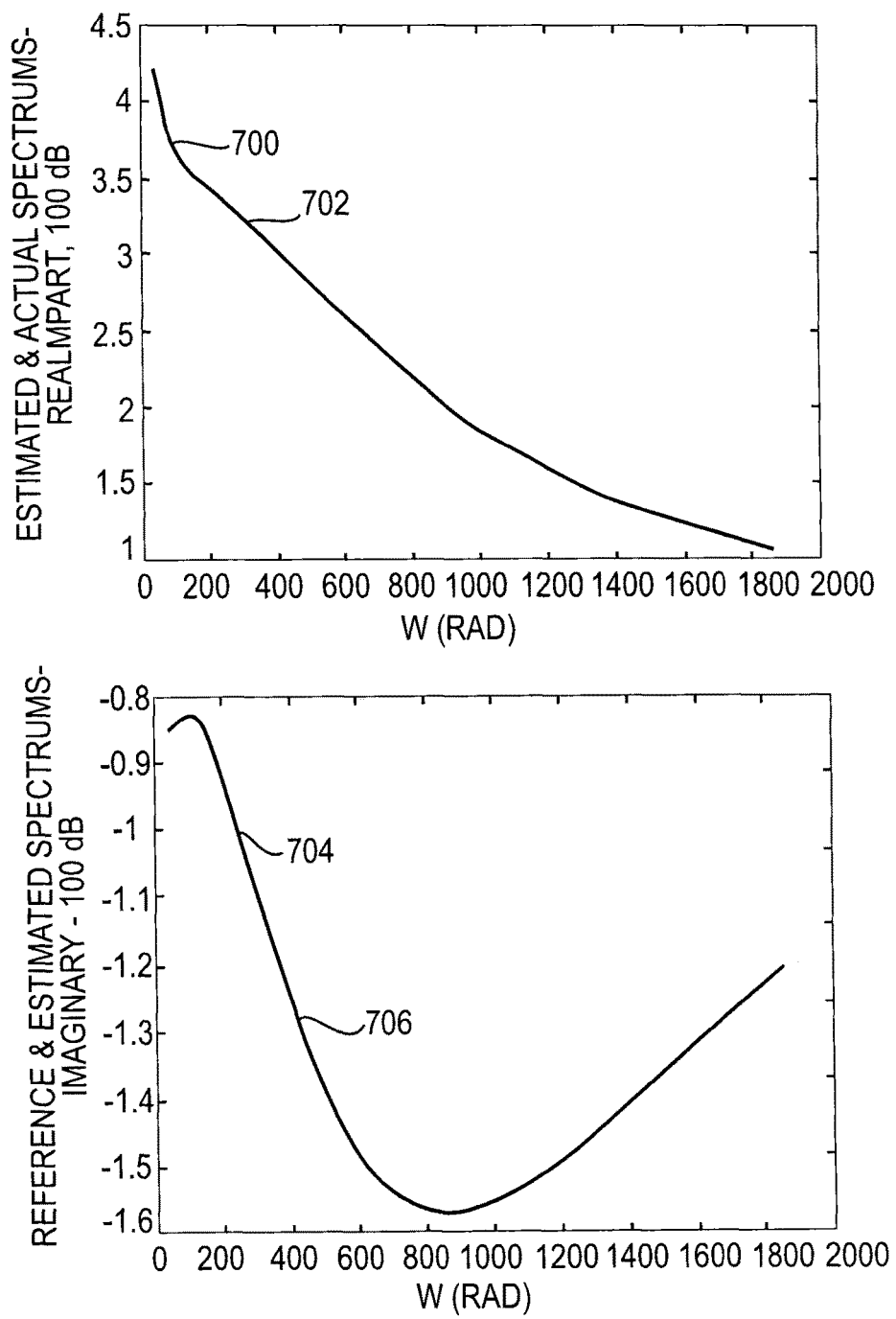
FIG. 7 shows real and imaginary part of the base truth and estimated spectrum according to one example.

FIG. 7 is a graph that shows the real and imaginary parts for the given and estimated spectrums with a SNR equals to 100 dB. The real parts of the spectrum are represented by traces 700, 702. The imaginary parts of the spectrum are represented by traces 704 and 706. The traces 700, 704 represent the base truth spectrum. The traces 702, 706 represent the estimated spectrum. As it can be seen in FIG. 7, the estimated spectrum converged to the base-truth spectrum.

Another example is considered with as signal to noise ratio equal to 40 dB. Table 8 shows the final estimates obtained at step S222 after the convergence condition is met. Table 8 shows three frequencies having the same value 8.2618. Thus, at step S224, the server sums the magnitudes to obtain 0.7928. Table 8 shows also three relaxation frequencies having comparable value 44.579, 44.5788 and 44.5774. The magnitudes are summed to obtain 1.1818 which is very close to the base truth value 1 shown in table 1.

TABLE 8

| Final estimates, SNR = 40 dB | | | | | | | | |
|---|---|---|---|---|---|---|---|---|
| | $\xi_n$ | | | | | | | |
| | 0 | 8.2618 | 44.579 | 8.2618 | 44.5788 | 44.5774 | 8.2633 | 904.5604 |
| Cn | 0.4627 | 0.2645 | 0.3944 | 0.2645 | 0.3944 | 0.393 | 0.2638 | 2.9823 |

Figure 8:
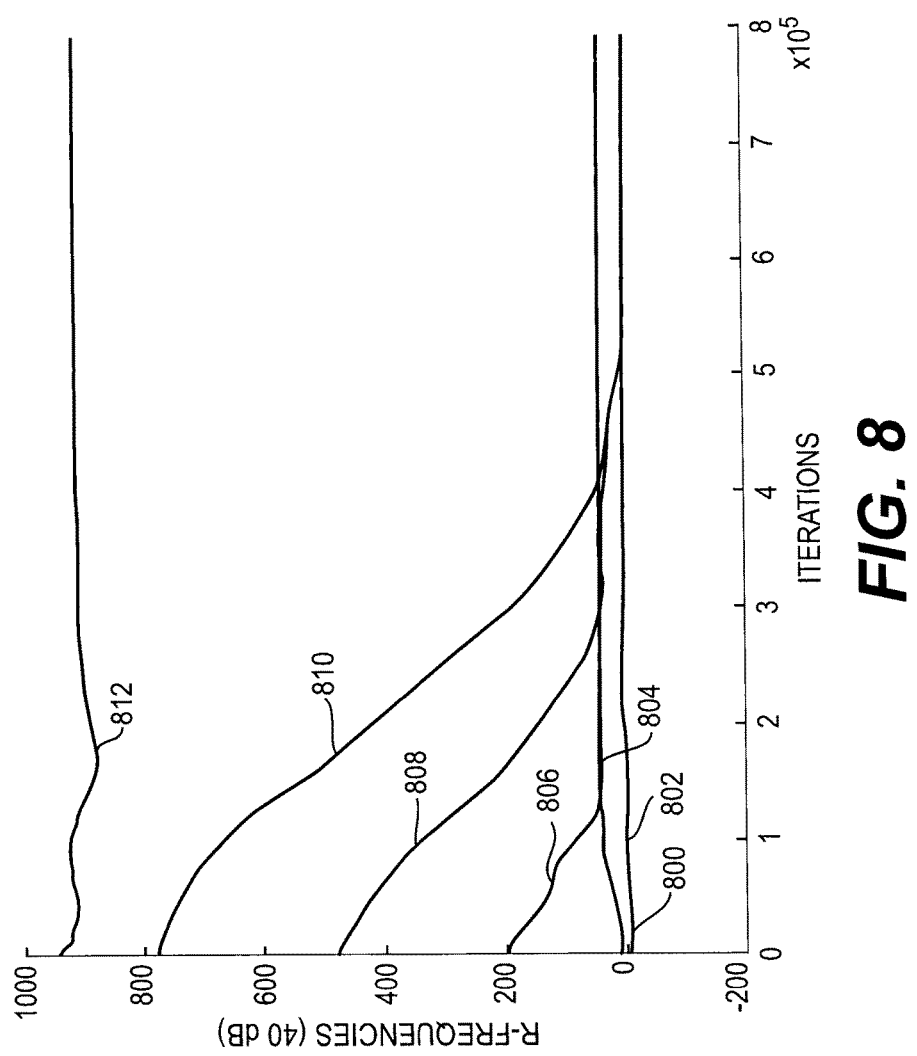
FIG. 8 shows evolution curves of the relaxation frequencies estimates according to one example.

FIG. 8 is a graph that shows the evolution of the relaxation frequencies values with the number of iterations. The traces 800, 802, 804, 806, 808, 810 and 812 show the relaxation frequencies values versus the iteration numbers.

Figure 9:
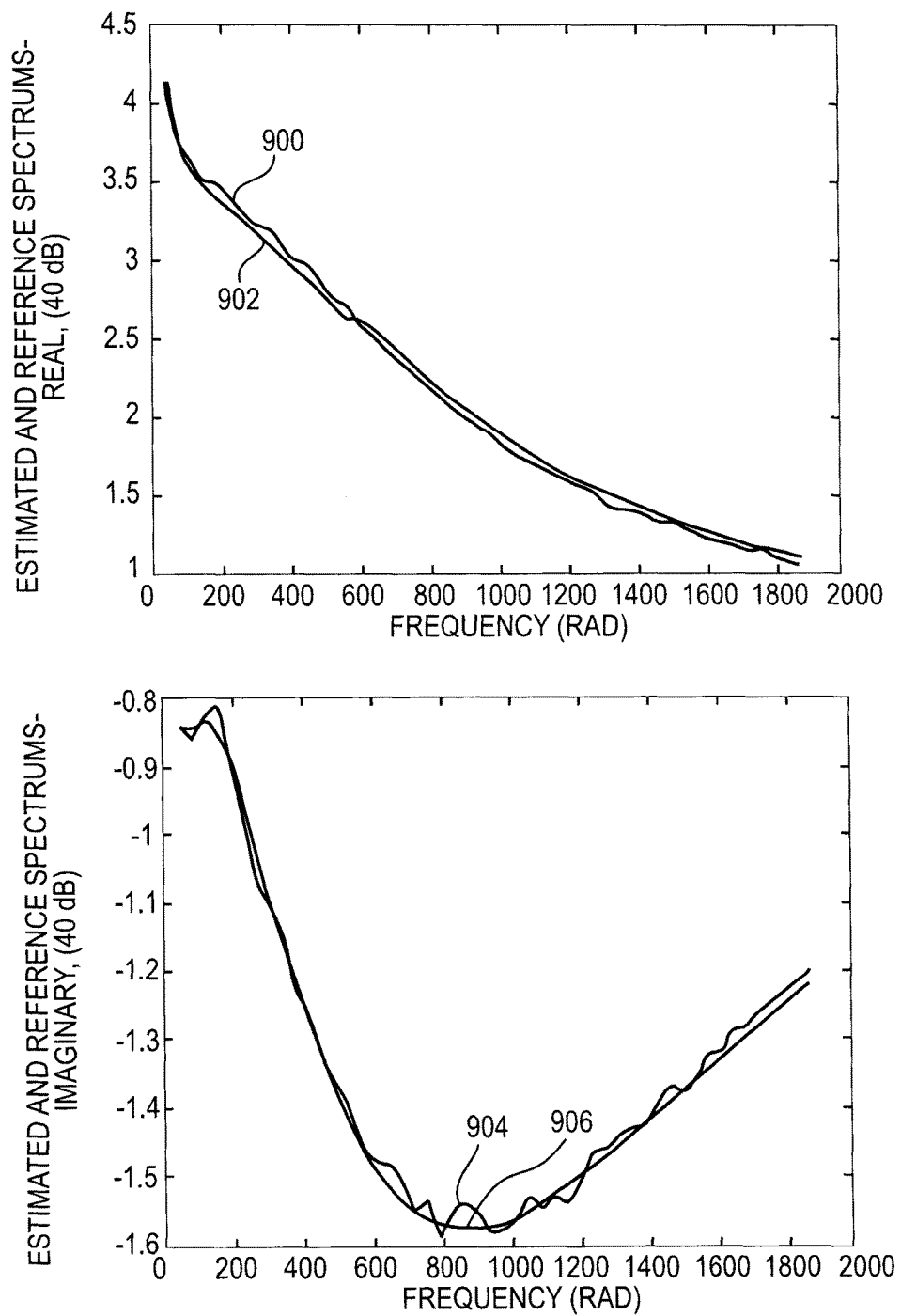
FIG. 9 shows real and imaginary part of the base truth and estimated spectrum according to one example.

FIG. 9 is a graph that shows the real and imaginary parts for the given and estimated spectrums with a SNR equals to 40 dB. The real parts of the spectrum are represented by traces 900, 902. The imaginary parts of the spectrum are represented by traces 904 and 906. The traces 900, 904 represent the base truth spectrum. The traces 902, 906 represent the estimated spectrum. As it can be seen in FIG. 9, the estimated spectrum converged to the base-truth spectrum.

Another example is considered with a signal to noise ratio equals to 20 dB. The final estimates of the values and the magnitudes of the relaxation frequencies are shown in table 9. Table 9 shows three frequencies having the same value 15.5779. Thus, at step S224, the server sums the magnitudes to obtain 2.8689. Table 9 shows two relaxation frequencies having comparable values 86.1780. The magnitudes are summed to obtain 0.7858 that is very close to the base truth value 1.

TABLE 9

Final estimates, SNR = 20 dB $\Xi_n$

| | 0 | 15.5779 | 15.5779 | 15.5779 | 86.1780 | 46.4476 | 86.1780 | 867.1185 |
|---|---|---|---|---|---|---|---|---|
| Cn | 0.8023 | 0.9803 | 0.9803 | 0.9803 | 0.3929 | −0.6019 | 0.3929 | 3.0245 |

Figure 10:
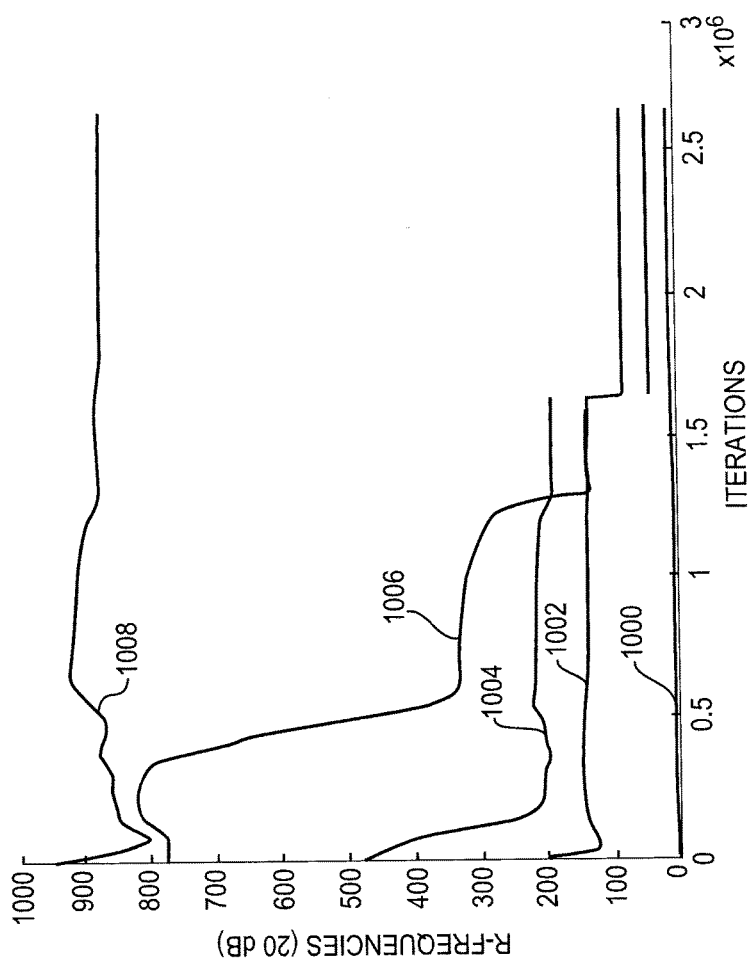
FIG. 10 shows evolution curves of the relaxation frequencies estimates according to one example.

FIG. 10 is a graph that shows the evolution of the relaxation frequencies values with the number of iterations. The traces 1000, 1002, 1004, 1006, and 1008 show the relaxation frequencies values versus the iteration numbers.

Figure 11:
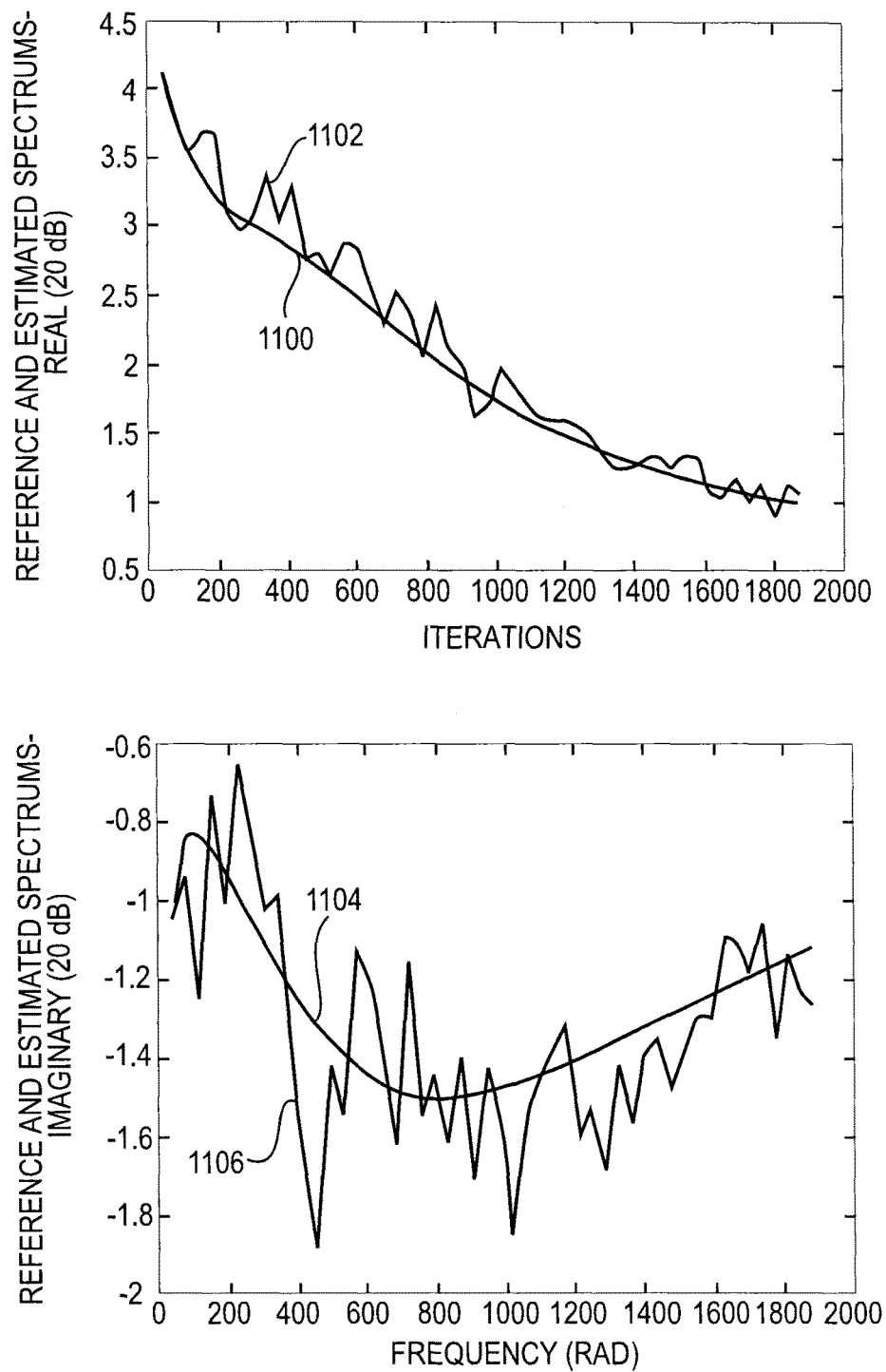
FIG. 11 shows real and imaginary part of the base truth and estimated spectrum according to one example.

FIG. 11 is a graph that shows the real and imaginary parts for the given and estimated spectrums with a SNR equals to 20 dB. The real parts of the spectrum are represented by traces 1100, 1102. The imaginary parts of the spectrum are represented by traces 1104 and 1106. The traces 1100, 1104 represent the base truth spectrum. The traces 1102, 1106 represent the estimated spectrum. As it can be seen in FIG. 11, the estimated spectrum converged very closely to the base-truth spectrum even in the presence of high noise.

In selected embodiments, the system may be used to detect specific relaxation frequencies that may correspond to certain buried objects of interest. In this case the values of the frequencies of interest are fixed and only their magnitudes are estimated to indicate their presence.

In one example, the complex spectrum is evaluated at 17 frequencies. The frequencies may be 30, 40, 50, 60, 70, 80, 90, 100, 200, 300, 500, 600, 700, 800, 900, 1000 and 2000. The initial guess made, at step S208, is shown in table 10. The final estimates is shown in table 11.

TABLE 10

Assumed fixed relaxation frequencies and their magnitudes $\zeta_n$

| | 0 | 10 | 50 | 100 | 400 | 500 | 700 | 900 |
|---|---|---|---|---|---|---|---|---|
| Cn | 0.7 | 3.8 | 4.2 | 2.8 | 3 | 5 | 4 | 4 |

TABLE 11

Final estimates $\zeta_n$

| | 0 | 10 | 50 | 100 | 400 | 500 | 700 | 900 |
|---|---|---|---|---|---|---|---|---|
| Cn | .4998 | 1.0004 | .9992 | .0011 | −.0171 | .0320 | −.0252 | 3.009 |

Figure 12:
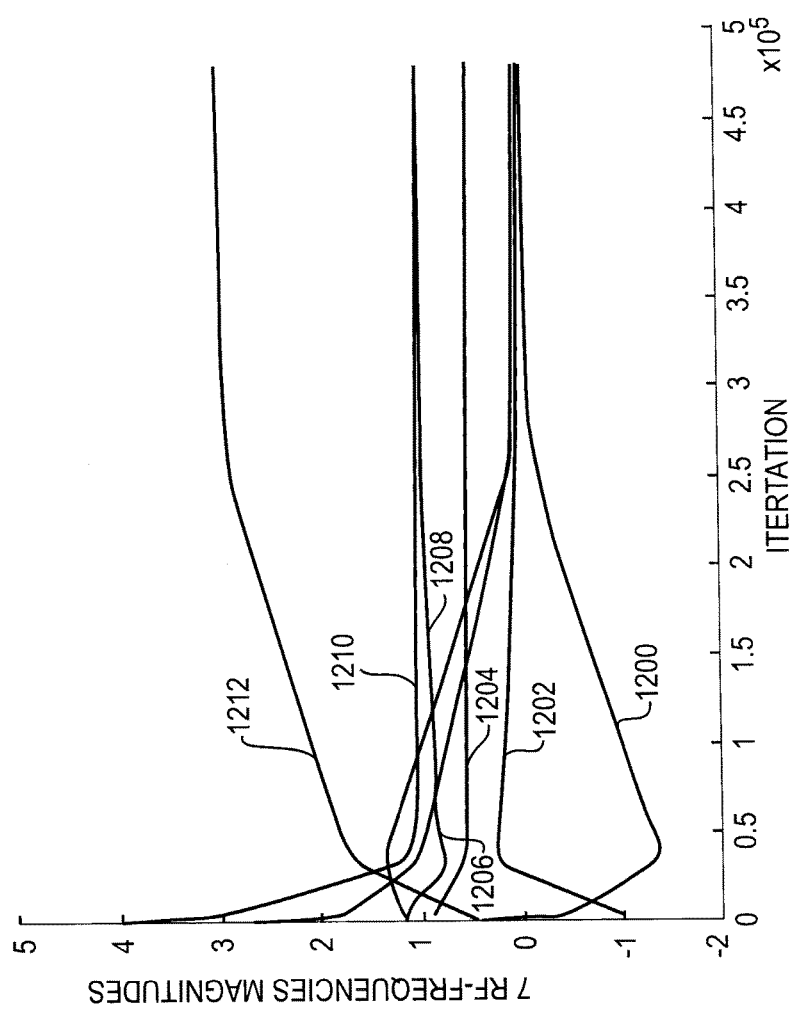
FIG. 12 shows the evolution curve of the magnitude of the fixed relaxation frequencies according to one example.

FIG. 12 is a graph that shows the evolution curves of the magnitude of the fixed relaxation frequencies. Trace 1200, 1202, 1204, 1206, 1208, 1210, and 1212 represents the amplitudes of the relaxation frequencies 0, 10, 50, 100, 400, 500, 700 and 900. As it can be noted the amplitudes of the relaxation frequencies having a value of 100, 400, 500 and 700 converged to zero which agree with the base truth value shown in table 1.

Figure 13:
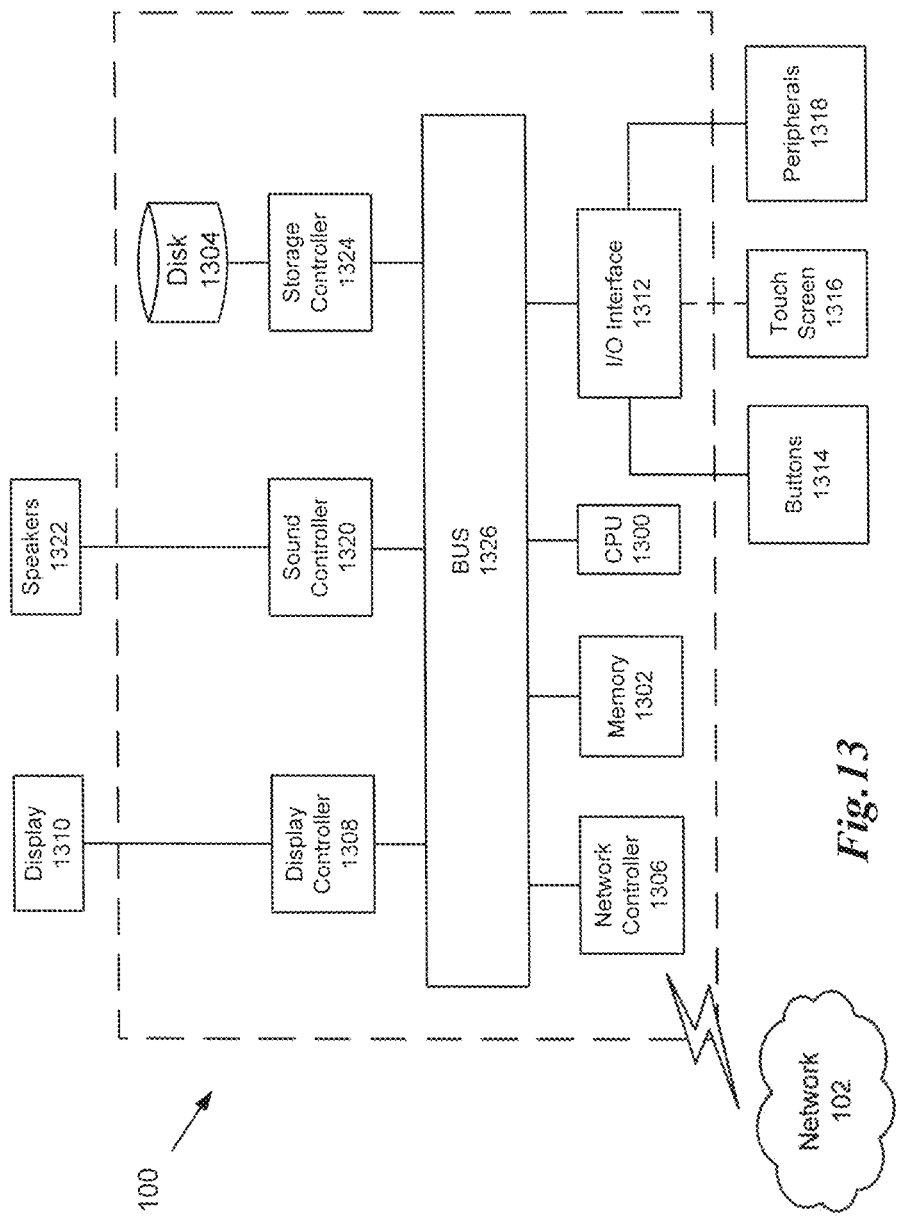
FIG. 13 is an exemplary block diagram of a server according to one example.

FIG. 13 is an exemplary block diagram of the server 100 according to one example. In FIG. 13, the server includes a CPU 1300 which performs the processes described above.

The process data and instructions may be stored in memory 1302. These processes and instructions may also be stored on a storage medium disk 1304 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server communicates, such as a server or computer.

Further, the claimed advancements may be provided as a utility application, background daemon, or component of an operating system, or combination thereof, executing in conjunction with CPU 1300 and an operating system such as Microsoft Windows 7, UNIX, Solaris, LINUX, Apple MAC-OS and other systems known to those skilled in the art.

CPU 1300 may be a Xenon or Core processor from Intel of America or an Opteron processor from AMD of America, or may be other processor types that would be recognized by one of ordinary skill in the art. Alternatively, the CPU 1300 may be implemented on an FPGA, ASIC, PLD or using discrete logic circuits, as one of ordinary skill in the art would recognize. Further, CPU 1300 may be implemented as multiple processors cooperatively working in parallel to perform the instructions of the inventive processes described above.

The server in FIG. 13 also includes a network controller 1306, such as an Intel Ethernet PRO network interface card from Intel Corporation of America, for interfacing with network 102. As can be appreciated, the network 102 can be a public network, such as the Internet, or a private network such as an LAN or WAN network, or any combination thereof and can also include PSTN or ISDN sub-networks. The network 102 can also be wireless such as a cellular network including EDGE, 3G and 4G wireless cellular systems. The wireless network can also be WiFi, Bluetooth, or any other wireless form of communication that is known.

The server further includes a display controller 1308, such as a NVIDIA GeForce GTX or Quadro graphics adaptor from NVIDIA Corporation of America for interfacing with display 1310, such as a Hewlett Packard HPL2445w LCD monitor. A general purpose I/O interface 1312 interfaces with a keyboard and/or mouse 1314 as well as a touch screen panel 1316 on or separate from display 1310. General purpose I/O interface also connects to a variety of peripherals 1318 including printers and scanners, such as an OfficeJet or DeskJet from Hewlett Packard.

A sound controller 1320 is also provided in the server, such as Sound Blaster X-Fi Titanium from Creative, to interface with speakers/microphone 1322 thereby providing sounds and/or music.

The general purpose storage controller 1324 connects the storage medium disk 1304 with communication bus 1326, which may be an ISA, EISA, VESA, PCI, or similar, for interconnecting all of the components of the server 100. A description of the general features and functionality of the display 1310, keyboard and/or mouse 1314, as well as the display controller 1308, storage controller 1324, network controller 1306, sound controller 1320, and general purpose I/O interface 1312 is omitted herein for brevity as these features are known.

A method that includes the features in the foregoing description provides numerous advantages to the users. In particular, the method determines the exact number of relaxation frequencies. In addition, the method estimates the magnitudes and the values of the relaxation frequencies. The method has a high resistance to noise. The method also permits fast real-time operation. The method does not require priori information about the system. Further, the method can perform the estimation of the values of the relaxation frequencies and their magnitudes jointly or separately. For example, the magnitude of the relaxation frequencies may be assumed and the values are estimated.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A method for identifying and estimating relaxation frequencies from a reflected signal of a ground penetrating radar signal, the method comprising:
   detecting, using a ground penetrating radar device, the reflected signal;
   obtaining an estimate of a number of the relaxation frequencies;
   computing, using processing circuitry, a complex spectrum based on the reflected signal at predetermined sampling frequencies;
   computing an expanded vector based on the complex spectrum;
   setting values and magnitudes for the relaxation frequencies;
   computing, based on the values and magnitudes of the relaxation frequencies previously set, a hypothesis expanded spectrum;
   updating, the magnitudes and the values of the relaxation frequencies using recursive processing;
   repeating the computing a hypothesis expanded spectrum step and the updating step until a predetermined convergence tolerance is met for magnitudes and values of the relaxation frequencies determined in successive iterations;
   summing the magnitudes of the relaxation frequencies when two or more relaxation frequencies have comparable values; and
   characterizing an underground object based on the values and magnitudes of the relaxation frequencies when the predetermined convergence tolerance is met.

2. The method of claim 1, wherein the determining comprises:
   calculating a percentage based on the values of the relaxation frequencies; and
   comparing the percentage with a predetermined percentage set by a user.

3. The method of claim 2, wherein the predetermined percentage is based on a projected noise level.

4. The method of claim 1, wherein the predetermined convergence tolerance is determined in response to meeting a convergence condition that comprises:
   calculating a first set of values based on successive values of the relaxation frequencies;
   calculating a second set of values based on successive magnitudes of the relaxation frequencies;
   comparing the first set of values and the second set of values with predetermined values; and
   determining that respective elements of the first set of values and the second set of values are less than the predetermined values.

5. The method of claim 4, wherein the convergence condition is:

$$|\zeta_i^n - \zeta_i^{n-1}| < \epsilon_1, \ |c_i^n - c_i^{n-1}| < \epsilon_2$$

where n represents the index at which the $n^{th}$ update is made;
$c_i$ are the magnitudes of the relaxation frequencies;
$\zeta_i$ are the values of the relaxation frequencies; and
$\epsilon_1$ and $\epsilon_2$ are predetermined values.

6. The method of claim 1, wherein the updating steps comprises:
   computing a mismatch;
   computing a reflect mismatch; and
   updating the magnitudes and values of the relaxation frequencies using $$\begin{bmatrix} C^{n+1} \\ \Psi^{n+1} \end{bmatrix} = \begin{bmatrix} C^n \\ \Psi^n \end{bmatrix} + T(n, \Omega, \Psi^n, C^n) F(n, \Omega, \Psi^n, C^n)$$

where $T(n, \Omega, \Psi^n, C^n)$ is the reflect mismatch,
$F(n, \Omega, \Psi^n, C^n)$ is the mismatch.

7. The method of claim 6, wherein computing the mismatch comprises applying $$F(n, \Omega, \Psi^n, C^n) = K \cdot \begin{bmatrix} \left[ \mathrm{Re}\left( H(\omega_1) - \sum_{i=0}^{L} c_i^n \cdot \frac{\zeta_i^n}{(\zeta_i^n)^2 + (\omega_1)^2} \right) \right]^\alpha \\ \vdots \\ \left[ \mathrm{Re}\left( H(\omega_N) - \sum_{i=0}^{L} c_i^n \cdot \frac{\zeta_i^n}{(\zeta_i^n)^2 + (\omega_N)^2} \right) \right]^\alpha \\ \left[ \mathrm{Im}\left( H(\omega_1) - \sum_{i=1}^{L} c_i^n \cdot \frac{\zeta_i^n}{(\zeta_i^n)^2 + (\omega_1)^2} \right) \right]^\alpha \\ \vdots \\ \left[ \mathrm{Im}\left( H(\omega_N) - \sum_{i=1}^{L} c_i^n \cdot \frac{\zeta_i^n}{(\zeta_i^n)^2 + (\omega_N)^2} \right) \right]^\alpha \end{bmatrix}$$

where H is the complex spectrum; and
K and $\alpha$ are predetermined positive constant.

8. The method of claim 6, wherein computing the reflect mismatch comprises applying $$T(n, \Omega, \Psi^n, C^n) = \begin{bmatrix} 1 & \cdots & 1 & 0 & \cdots & 0 \\ \frac{(\zeta_1^n)^2}{(\zeta_1^n)^2 + (\omega_1)^2} & \cdots & \frac{(\zeta_1^n)^2}{(\zeta_1^n)^2 + (\omega_N)^2} & \frac{-\zeta_1^n \cdot \omega_1}{(\zeta_1^n)^2 + (\omega_1)^2} & \cdots & \frac{-\zeta_1^n \cdot \omega_N}{(\zeta_1^n)^2 + (\omega_N)^2} \\ \vdots & \ddots & \vdots & \vdots & \ddots & \vdots \\ \frac{(\zeta_L^n)^2}{(\zeta_L^n)^2 + (\omega_1)^2} & \cdots & \frac{(\zeta_L^n)^2}{(\zeta_L^n)^2 + (\omega_N)^2} & \frac{-\zeta_L^n \cdot \omega_1}{(\zeta_L^n)^2 + (\omega_1)^2} & \cdots & \frac{-\zeta_L^n \cdot \omega_N}{(\zeta_L^n)^2 + (\omega_N)^2} \\ 2 \cdot c_1 \cdot \frac{\zeta_1^n \cdot \omega_1^2}{[(\zeta_1^n)^2 + (\omega_1)^2]^2} & \cdots & 2 \cdot c_1 \cdot \frac{\zeta_1^n \cdot \omega_N^2}{[(\zeta_1^n)^2 + (\omega_N)^2]^2} & c_1 \cdot \omega_1 \cdot \frac{(\zeta_1^n)^2 - \omega_1^2}{[(\zeta_1^n)^2 + (\omega_1)^2]^2} & \cdots & c_1 \cdot \omega_N \cdot \frac{(\zeta_1^n)^2 - \omega_N^2}{[(\zeta_1^n)^2 + (\omega_N)^2]^2} \\ \vdots & \ddots & \vdots & \vdots & \ddots & \vdots \\ 2 \cdot c_L \cdot \frac{\zeta_L^n \cdot \omega_1^2}{[(\zeta_L^n)^2 + (\omega_1)^2]^2} & \cdots & 2 \cdot c_L \cdot \frac{\zeta_L^n \cdot \omega_N^2}{[(\zeta_1^n)^2 + (\omega_N)^2]^2} & c_L \cdot \omega_1 \cdot \frac{(\zeta_L^n)^2 - \omega_1^2}{[(\zeta_L^n)^2 + (\omega_1)^2]^2} & \cdots & c_L \cdot \omega_N \cdot \frac{(\zeta_L^n)^2 - \omega_N^2}{[(\zeta_L^n)^2 + (\omega_N)^2]^2} \end{bmatrix}.$$

9. The method of claim 1, wherein the values of the relaxation frequencies are fixed.

10. The method of claim 1, wherein the magnitudes of the relaxation frequencies are fixed.

11. The method of claim 1, wherein the estimate of the number of the relaxation frequencies, and the values and magnitudes of the relaxation frequencies are obtained from the user.

12. The method of claim 1, wherein the estimate of the number of the relaxation frequencies, and the values and magnitudes of the relaxation frequencies are calculated using the processing circuitry based on past data.

13. A system for identifying and estimating relaxation frequencies from a reflected signal of a ground penetrating radar signal, the system comprising:
a ground penetrating radar device configured to detect the reflected signal;
processing circuitry configured to obtain an estimate of a number of the relaxation frequencies;
compute a complex spectrum based on the reflected signal at predetermined sampling frequencies;
compute an expanded vector based on the complex spectrum;
set values and magnitudes for the relaxation frequencies;
compute, based on the values and magnitudes of the relaxation frequencies previously set, a hypothesis expanded spectrum;
update, the magnitudes and the values of the relaxation frequencies using recursive processing; and
repeat the computing a hypothesis expanded spectrum step and the updating step until a predetermined convergence tolerance is met for the magnitudes and values of the relaxation frequencies, the magnitudes and values being determined at successive iterations; and
summing the magnitudes of the relaxation frequencies when two or more relaxation frequencies have comparable values.

14. The system of claim 13, wherein the determining comprises:
calculating a percentage based on the values of the relaxation frequencies; and
comparing the percentage with a predetermined percentage set by a user.

15. The system of claim 14, wherein the predetermined percentage is based on a projected noise level.

16. The system of claim 13, wherein the predetermined convergence tolerance is determined in response to meeting a convergence condition that comprises:

calculating a first set of values based on successive values of the relaxation frequencies;
calculating a second set of values based on successive magnitudes of the relaxation frequencies;
comparing the first set of values and the second set of values with predetermined values; and
determining that respective elements of the first set of values and the second set of values are less than the predetermined values.

17. The system of claim 16, wherein the convergence condition is:

$$|\zeta_i^n - \zeta_i^{n-1}| < \epsilon_1, \ |c_i^n - c_i^{n-1}| < \epsilon_2$$

where n represents the index at which the $n^{th}$ update is made;
$c_i$ are the magnitudes of the relaxation frequencies;
$\zeta_i$ are the values of the relaxation frequencies; and
$\epsilon_1$ and $\epsilon_2$ are predetermined values.

18. The system of claim 13, wherein the updating steps comprises:
computing a mismatch;
computing a reflect mismatch; and
updating the magnitudes and values of the relaxation frequencies using $$\begin{bmatrix} C^{n+1} \\ \Psi^{n+1} \end{bmatrix} = \begin{bmatrix} C^n \\ \Psi^n \end{bmatrix} + T(n, \Omega, \Psi^n, C^n) F(n, \Omega, \Psi^n, C^n)$$

where $T(n, \Omega, \Psi^n, C^n)$ is the reflect mismatch,
$F(n, \Omega, \Psi^n, C^n)$ is the mismatch.

19. A system for identifying and estimating relaxation frequencies from a reflected signal of a ground penetrating radar signal, the system comprising:
a ground penetrating radar device configured to detect the reflected signal;
processing circuitry configured to obtain an estimate of a number of the relaxation frequencies;
compute a complex spectrum based on the reflected signal at predetermined sampling frequencies;
compute an expanded vector based on the complex spectrum;
set values and magnitudes for the relaxation frequencies;
compute, based on the values and magnitudes of the relaxation frequencies previously set, a hypothesis expanded spectrum;
update, the magnitudes and the values of the relaxation frequencies using recursive processing; and repeat the computing a hypothesis expanded spectrum step and the updating step until a predetermined convergence tolerance is met for the magnitudes and values of the relaxation frequencies, the magnitudes and values being determined at successive iterations; and wherein a convergence condition associated with the predetermined convergence tolerance is:

$$|\zeta_i^n - \zeta_i^{n-1}| < \epsilon_1, \quad |c_i^n - c_i^{n-1}| < \epsilon_2$$

where n represents the index at which the $n^{th}$ update is made;

$c_i$ are the magnitudes of the relaxation frequencies;

$\zeta_i$ are the values of the relaxation frequencies; and $\epsilon_1$ and $\epsilon_2$ are predetermined values.

* * * * *